United States Patent [19]

Yamashita et al.

[11] Patent Number: 5,457,677
[45] Date of Patent: Oct. 10, 1995

[54] ADAPTER FOR A SMALL CD

[75] Inventors: Toshirou Yamashita; Atsushi Kurosawa; Kiyoshi Morikawa; Tomomichi Kimura, all of Saitama, Japan

[73] Assignee: Pioneer Electronic Corporation, Tokyo, Japan

[21] Appl. No.: 943,611

[22] Filed: Sep. 11, 1992

[30] Foreign Application Priority Data

Sep. 27, 1991 [JP] Japan .................................. 3-277251
Sep. 27, 1991 [JP] Japan .................................. 3-277252

[51] Int. Cl.⁶ .............................................. G11B 23/03
[52] U.S. Cl. ............................................. 369/289; 369/291
[58] Field of Search .................................. 369/289, 290, 369/291

[56] References Cited

U.S. PATENT DOCUMENTS

| | | | |
|---|---|---|---|
| 2,285,139 | 6/1942 | Andres | 369/289 |
| 4,159,827 | 7/1979 | Torrington | 369/291 |
| 4,707,821 | 11/1987 | Verhagen | 369/291 |
| 4,928,271 | 5/1990 | Verhagen | 369/289 |
| 5,058,100 | 10/1991 | Yoshii | 369/291 |
| 5,204,853 | 4/1993 | Kamoshita | 369/289 |

Primary Examiner—Richard A. Berisch
Assistant Examiner—Ted Kim
Attorney, Agent, or Firm—Nikaido, Marmelstein, Murray & Oram

[57] ABSTRACT

A CD player has a magazine having a plurality of shelves each of which is provided for mounting an ordinary 12 cm CD. An adapter has a thickness so as to be mounted on the shelf of the magazine and has a U-shaped form having an arc corresponding to a circumference of a small CD. The adapter is so arranged that the center of the small CD attached to the adapter is deflected from the center of the ordinary CD to be mounted on the shelf when the adapter is mounted on the shelf of the magazine.

2 Claims, 8 Drawing Sheets

ADAPTER FOR A SMALL CD

BACKGROUND OF THE INVENTION

The present invention relates to an adapter for mounting a small CD having a diameter of 8 cm, in a magazine of a CD player (multi-play CD Changer).

The multi-play CD changer wherein a plurality of ordinary 12 cm CDs can be played continuously or selectively has become common in a car stereo system. The CD changer is provided with a magazine in which a plurality of CDs are mounted.

Referring to FIG. 10, a magazine a is divided into a plurality of shelves, for example, six shelves, each having an opening d through which a CD is inserted. The magazine a is mounted in a CD player b through an opening c. The CDs are selectively ejected out through each opening d so as to be played on the player b. A window g is formed in the magazine a so that the CDs can be checked through the window g when the magazine is loaded in the player b.

A 12 cm CD is mounted on each shelf of the magazine a and held therein by a spring for preventing the CD from coming out through the openings d. An eject arm is provided in each shelf for pushing out the CD against the urging of the spring when playing the CD. An 8 cm CD may also be mounted in the magazine if an adapter is used.

A conventional adapter is in a shape of a ring having a diameter of 12 cm and a center hole a diameter of which is 8 cm. The 8 cm CD fits in the center hole. Thus, when exchanging the CDs, the entire adapter and the CD must be taken out of the magazine, which is awkward.

In addition, the adapter holding the 8 cm CD is inserted in a playback position and the CD is loaded in a reproducing device. At that time, the 8 cm CD may fall out of the adapter, which makes it impossible to play the CD.

SUMMARY OF THE INVENTION

An object of the present invention is to provide an adapter for an 8 cm CD wherein the CD can be easily exchanged.

Another object of the present invention is to provide an adapter where the CD can be properly carried to a playback position of the CD player and reproduced without fail.

According to the present invention there is provided an adapter of an 8 cm CD, the adapter is slidably mounted in a magazine of a CD player through a CD opening in a radial direction of the CD, and engageable with the magazine, so as to be protruded out of the magazine a predetermined distance during the operation.

The adapter has an inner space for holding the 8 cm CD, which is formed deflected from the center of a 12 cm CD to be mounted in the magazine.

The adapter is adapted to be loaded in the magazine so that the space for the 8 cm CD is disposed adjacent the CD opening.

The other objects and features of this invention will become understood from the following description with reference to the accompanying drawings.

DETAILED DESCRIPTION OF THE PREFERRED EMBODIMENT

Figure 1:
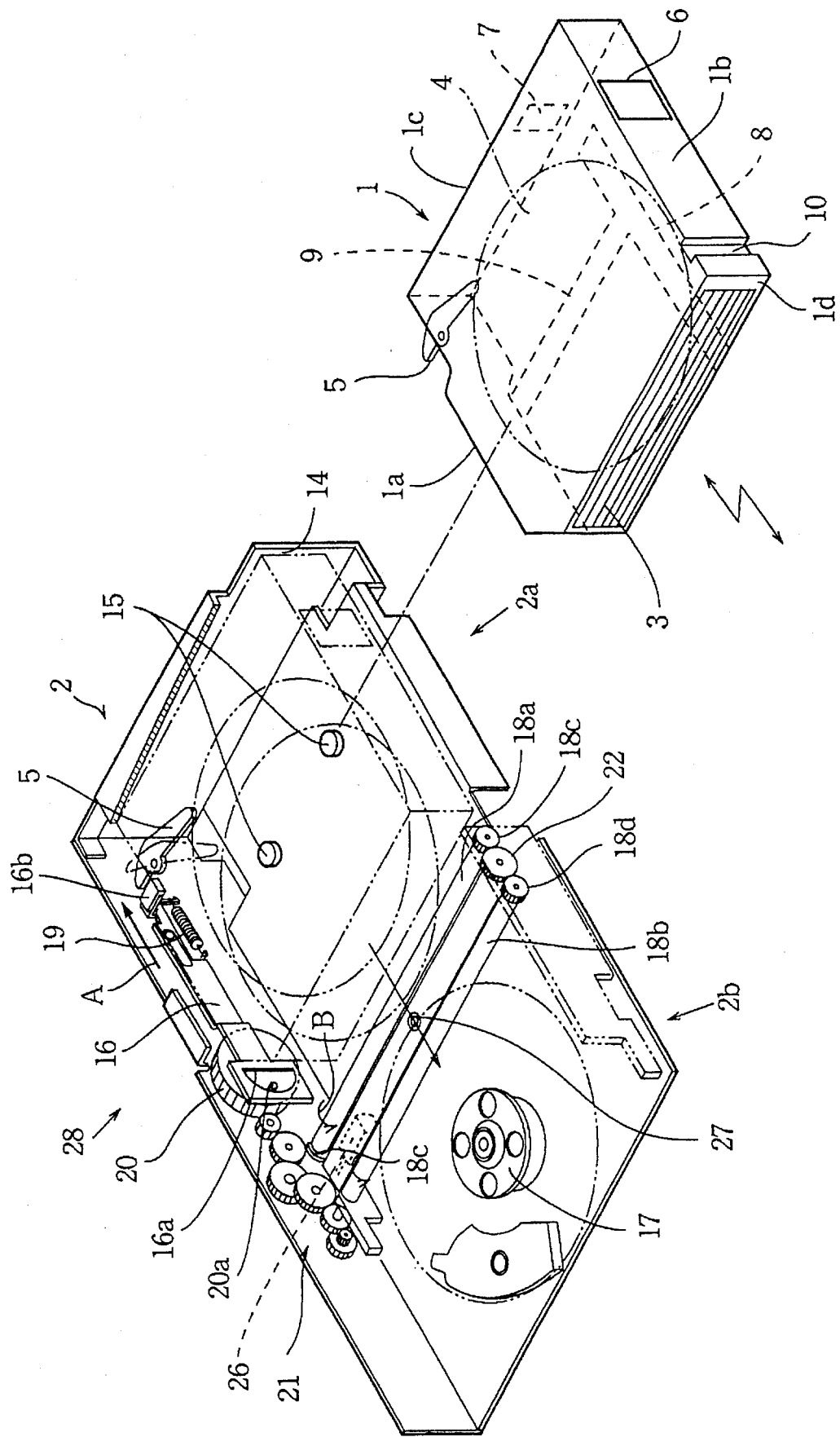
FIG. 1 is a perspective view of an example of a CD player and a magazine thereof in which an CD adapter of the present invention is applied.

Referring to FIG. 1 a CD magazine 1, to which an 8 cm CD adapter of the present invention is applied, is substantially square in plan view and has four sides 1a to 1d. The magazine 1 has a plurality of horizontal shelves 3, for example six, each opening at the side 1d. An ordinary 12 cm CD 4 is loaded in each shelf 3. Windows 6 and 7, each embedded with a transparent plate, are formed on the sides 1b and 1c, respectively, for checking whether the CDs 4 are loaded in the magazine 1.

A CD player 2 (multi-play CD changer) has a magazine setting section 2a in which the CD magazine 1 is inserted, and a playback section 2b to which the CDs 4 in the magazine is transferred so as to be played. The magazine setting section 2a has a lateral opening 14 and a longitudinally disposed pair of guide pins 15 on the bottom thereof. A clamper 17 for holding the CD 4 is provided in the playback section 2b.

Provided in the CD player 2 is a loading mechanism 28 which extends in the magazine setting section 2a and the playback section 2b. The loading mechanism 28 has a reciprocating bar 16 and a servomotor 26 operated by a control unit (not shown) for operating the reciprocating bar 16 through a gear train 21 and a gear 20. The bar 16 is provided to be vertically moved by a lifting mechanism (not shown), so that one end 16b thereof selectively engages with one of eject arms 5 provided at every shelf 3 for ejecting the selected CD 4. The other end has a semicircular cam hole 16a in which an eccentric pin 20a fixed on the gear 20 engages. The bar 16 is urged by a return spring 19 in a direction to release the eject arm 5 from the CD 4.

A pair of longitudinal rubber feed rollers 18a and 18b are disposed between the magazine setting section 2a and the playback section 2b. The feed roller 18a adjacent the magazine setting section 2a has gears 18c at the ends thereof. One of the gears 18c meshes with one of the gears of the gear train 21. The other gear 18c is connected to a gear 18d of the feed roller 18b through a gear 22. Hence, when the servomotor 26 is operated, the feed rollers 18a and 18b are rotated in the same direction at the same speed.

A photodetector 27 connected to the control unit is provided on the underside of a top plate of the CD player 2 at a position between the feed rollers 18a and 8b. The photodetector 27 detects the CD 4 when the CD is on the feed rollers 18a and 18b, thereby controlling the operation of the servomotor 26.

Figure 2:
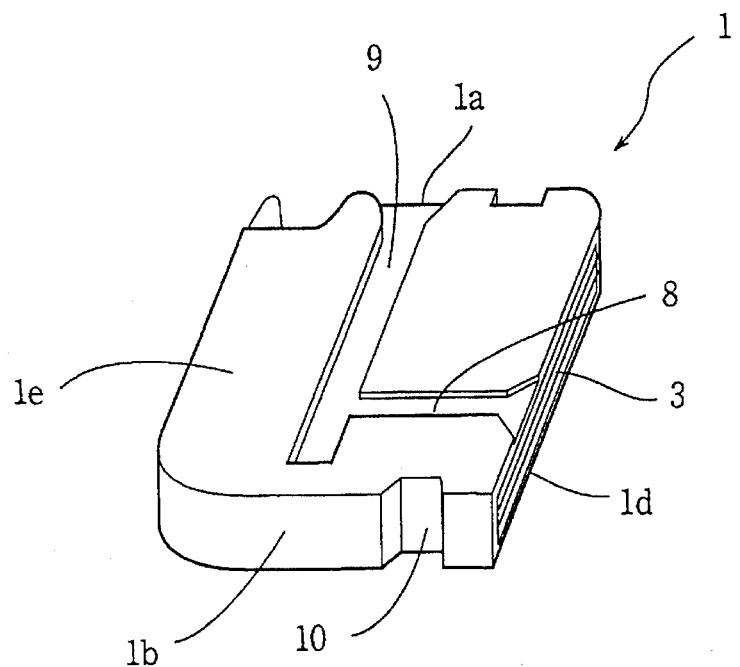
FIG. 2 is a perspective view of the magazine of FIG. 1 as viewed from the underside.

Referring to FIG. 2, the magazine 1 has a first guide groove 8 and a second guide groove 9 on an underside 1e thereof, and a vertical third guide groove 10 on the side 1b. The first guide groove 8 laterally extends along the side 1b at a position deflected from the center toward the side 1b and opens at the side 1d. The second guide groove 9 extends longitudinally, that is, perpendicular to the groove 8 at the center of the underside 1e, and forms an opening at the side 1a. The guide grooves 8, 9 and 10 selectively engage with guide pins provided on a CD player. In the embodiment shown in FIG. 1, the second groove 9 engages with the guide pins 15 of the CD player 2. Thus by providing various guide grooves, the magazine 1 may be mounted on different types of CD players.

Figure 3:
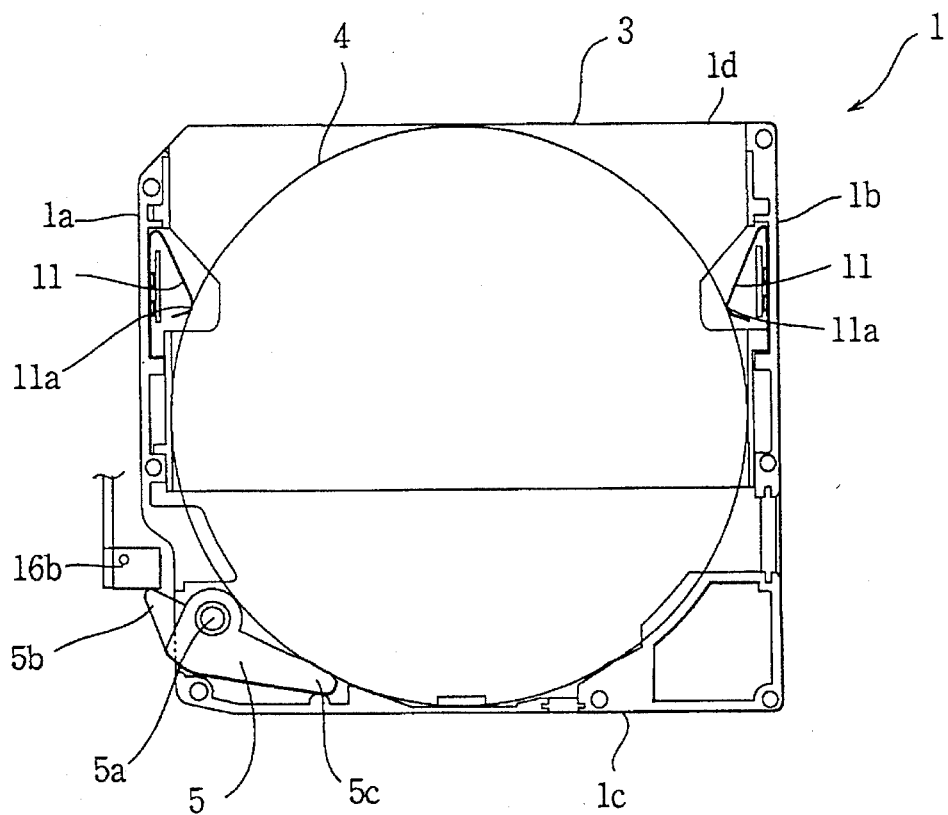
FIG. 3 shows a shelf formed in the magazine when a 12 cm CD is loaded.

Referring to FIG. 3, a pair of springs 11, each having a lobe 11a, are disposed in each shelf 3 of the magazine 1 on the inner walls of the sides 1a and 1b adjacent the side 1d. The eject arm 5 mounted on a pivot 5a is disposed in each shelf 3 at the corner between the sides 1a and 1c. The eject arm 5 has an end 5b which engages with the bar 16b of the rod 16 in the CD player 2, and an opposite end 5c which engages with the CD 4. Upon inserting the CD 4 in the magazine 1, the CD 4 urges the springs 11 to expand the space therebetween and pushes the end 5c of the eject arm 5, rotating the arm 5 about the pivot 5a. When the CD 4 is fully inserted, the lobe 11a of each spring 11 abuts on the periphery of the CD 4 to hold it. When the eject arm 5 is rotated in the opposite direction, either by hand or by the bar 16 of the loading mechanism 28 of the CD player 2, the eject arm 5 pushes the CD 4 out of the shelf 3 against the urging of the springs 11.

Figure 4:
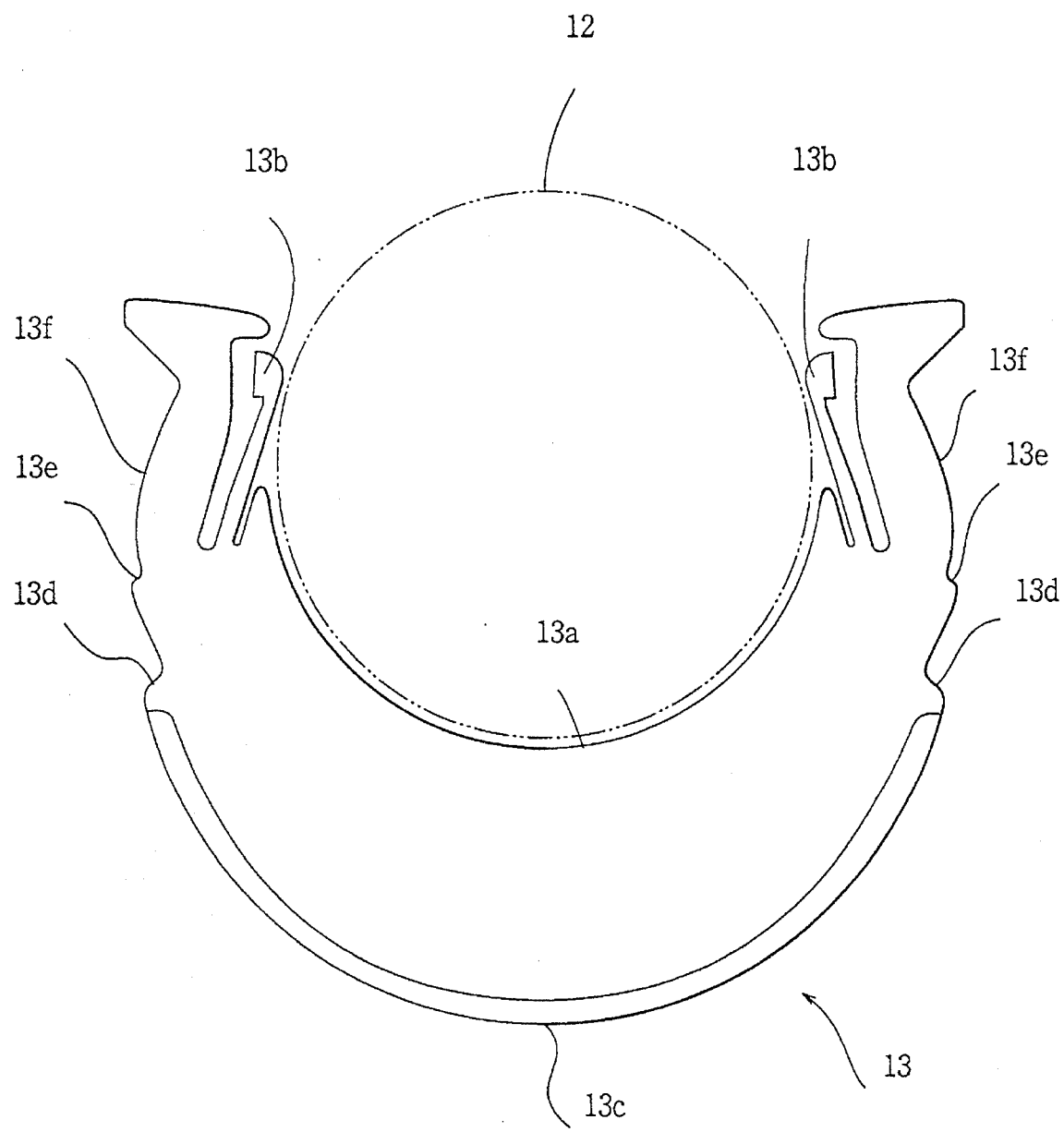
FIG. 4 is a plan view of the CD adapter according to the present invention.

Referring to FIG. 4, a CD adapter 13 has a thickness so that it can be inserted on the shelf 3 in the magazine 1. The CD adapter 13 has a U-shaped form having an outer periphery 13 which corresponds to the circumference of the 12 cm CD 4. An inner periphery 13a has an arc corresponding to the circumference of an 8 cm CD 12. The center of a circle of the arc is eccentrically and outwardly located with respect to the center of the 12 cm CD, thereby defining a space in which the 8 cm CD 12 is inserted in the radial direction of the CD.

When the adapter 13 is inserted on the shelf in the magazine, a part of the CD 12 extrudes out of the adapter 12.

A flexible lug 13b is formed at each end of the inner periphery 13a so as to hold the CD 12. A first recess 13d, second recess 13e and a curve 13f are formed adjacent each end of the outer periphery 13c. Each of the recesses 13d and 13e and the curves 13f engages with the lobes 11a of the springs 11 mounted in the magazine 1 at different stages of operation.

The operation of the present invention is described hereinafter. First of all, CDs 4 are inserted on the shelves 3 of the magazine 1. The magazine 1 is then mounted in the CD player 2. If the CD player 2 has the playback section 2b at the left side of the magazine setting section 2a as shown in FIG. 1, and schematically in FIG. 6a, the magazine 1 is inserted into the opening 14 of the CD player 2 at the side 1a. Only the second groove 9 engages with the guide pins 15, so that the magazine is mounted in the correct position. When the magazine 1 is thus correctly mounted as shown in FIG. 7a, the window 6 on the side 1b is exposed through the opening 14, thereby enabling the CDs to be confirmed without pulling out the magazine 1.

Figure 6:
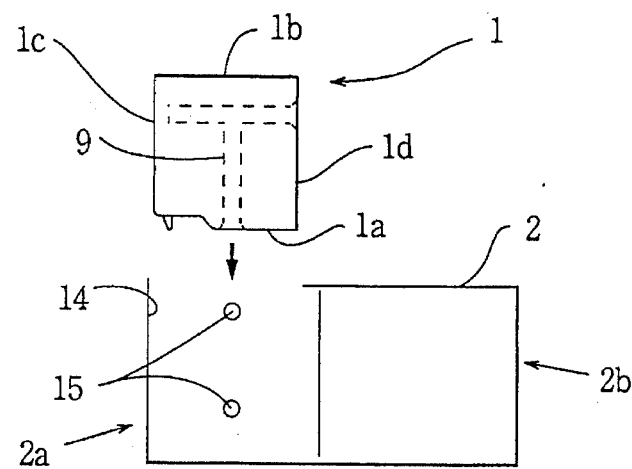
FIGS. 6a to 6c are schematic diagrams for explaining the mounting directions of the magazine in various CD players.
Figure 6:
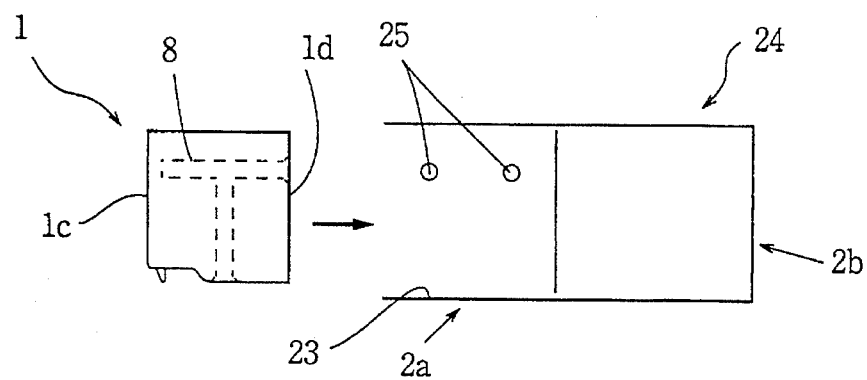
Figure 6:
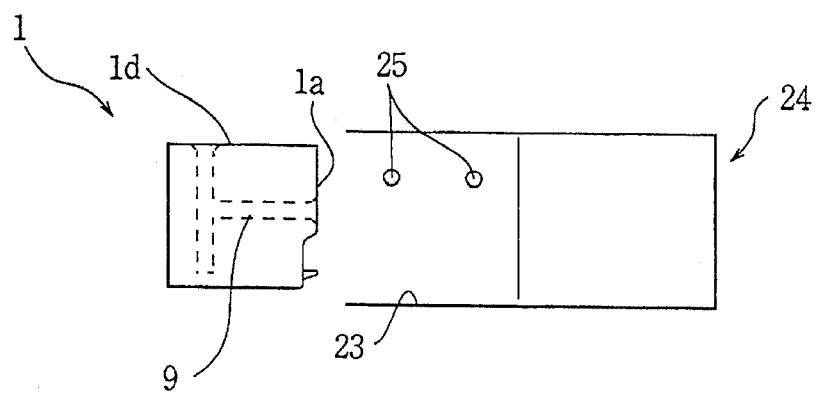
Figure 7:
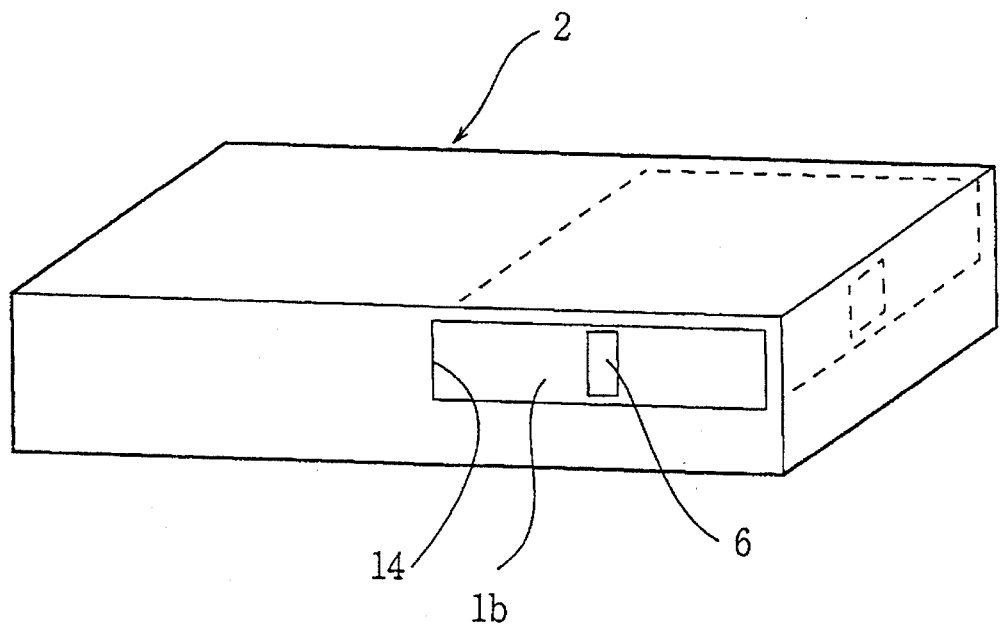
FIGS. 7a and 7b are schematic perspective views of the CD player corresponding to FIGS. 6a and 6b, respectively.
Figure 7:
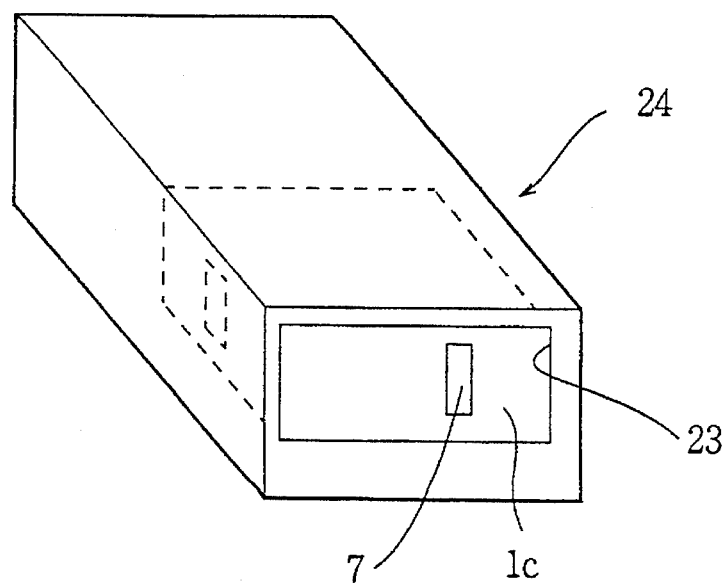

Referring to FIG. 6b, the magazine 1 may be mounted on a CD player 24 having a different arrangement, where the playback section 2b is disposed at the rear of the magazine setting section 2a. The CD player 24 has a magazine opening 23 and longitudinally disposed bottom guide pins 25. The magazine 1 is inserted through the opening 23 at the side 1d, thereby engaging the first guide grove 8 with the guide pins 25. In such an arrangement, the window 7 at the side 1c becomes apparent through the opening 23 as shown in FIG. 7b. If a user tries to insert the magazine 1 into the CD player 24 at the side 1a as shown in FIG. 6c, the guide pins 25 abut against the wall so that the magazine 1 cannot be inserted.

Referring to FIG. 1, when the magazine 1 is thus correctly mounted in the CD player 2, the eject arms 5 are positioned to confront the end 5b thereof against the end 16b of the bar 16. On the other hand, a part of the periphery of CD 4 is disposed adjacent the feed rollers 18a and 18b. In order to play the CD 4, the servomotor 26 is operated in accordance with the operation of the control unit. As a result, the gear train 21 and the gear 20 is driven to move the bar 16 in a direction shown by an arrow A. The end 16b of the bar 16 selectively engages one of the eject arms 5 at the end 5b so that the arm is rotated about the pivot 5a. The CD 4 is pushed out so that a part of the CD rests on the rollers 18a and 18b. The rollers 18a and 18b, which are rotated in a direction shown by an arrow B by the servomotor 26 through the gear train 21, carries the CD 4 to the playback section 2b. The CD 4 is raised and held by clamper 17 in the playback section, thereby starting the playback.

When the CD player stops playing the CD 4, the CD is lowered and released from the clamper 17. The feed rollers 18a and 18b are rotated in an opposite direction as before, so that the CD 4 returns to the shelf 3 of the magazine 1 and held by the springs 11.

Figure 5:
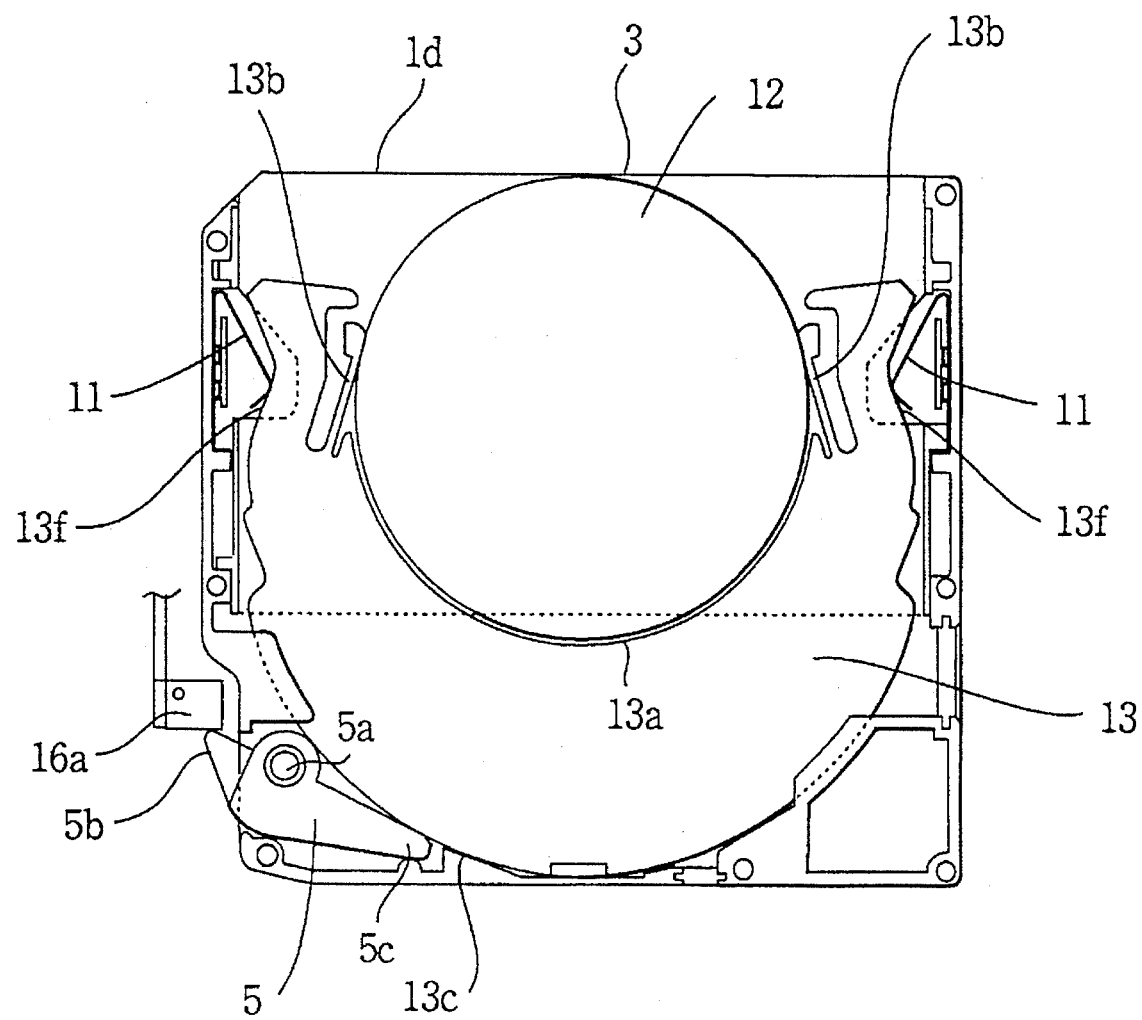
FIG. 5 shows the shelf of the magazine when the adapter and an 8 cm CD are loaded.

In order to load the 8 cm CD 12 in the magazine, the CD adapter 13 is inserted in the shelf 3 by hand as shown in FIG. 5. As the adapter 13 is pushed inside, the springs 11 is yielded to expand the space therebetween. The end 5c of the eject arm 5 in the shelf 3 is pushed by the outer periphery 13c of the adapter 13 to an innermost position. At the same time, the lobes 11a of the springs 11 abut on the curves 13f to hold the adapter. The CD 12 is then inserted in the shelf 3 so that the outer periphery thereof fits in the inner periphery 13a and held by the lugs 13b.

Figure 8:
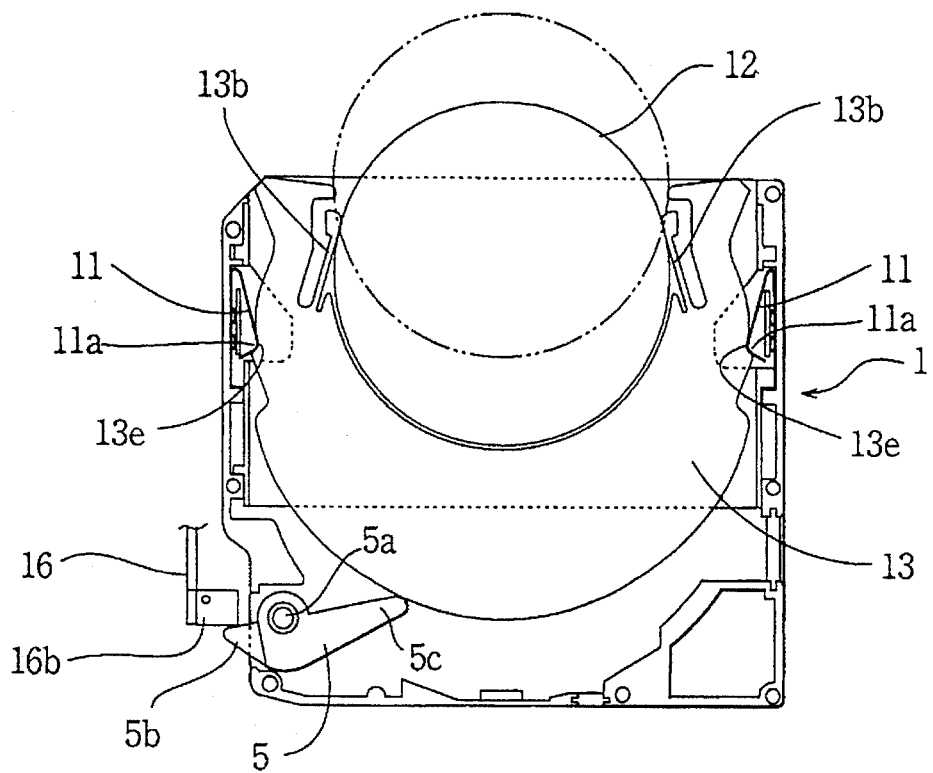
FIG. 8 is a diagram explaining the positions of the CD and the CD adapter in the magazine during the operation of the CD player.

After the magazine 1 is set in the CD player 2, the player 2 is operated to play the CD 12. The servomotor 26 is driven so that the bar 16 is shifted in the direction A. The end 16b pushes the end 5b of the eject arm 5, thereby rendering the end 5c to push the adapter 13 outward until the lobes 11a of the springs 11 engage with the second recesses 13e as shown in FIG. 8. When the rollers 18a and 18b are rotated in the direction B, only the CD 12 is carried into the playback section 2b by the friction between the CD and the rollers against the load of the lugs 13b. As a result, the adapter 13 is left in the shelf 3. The CD 12 is held in the playback section by the clamper 17 and played.

When the player finishes playing the CD 12, the clamper 17 releases the CD and the feed rollers 18a and 18b are rotated in a direction opposite of B by the servomotor 26. Thus, the CD 12 returns toward the magazine 1. At the same time, the control unit operates the servomotor 26 to shift the bar 16 in the direction A so that the eject arm 5 is maintained in the position shown in FIG. 8. Since the eject arm 5 firmly holds the adapter 13 to prevent the adapter 13 from being pushed rearward, the CD 12 can be properly inserted in the adapter 13, outwardly yielding the lugs 13b. When the photodetector 27 detects that the CD 12 is not on the roller 18b, which is disposed adjacent the playback section 2b, it means that the CD 12 is sufficiently inserted into the adapter 13. The servomotor 26 is then operated to return the bar 16 to its initial position by the return spring 19. The eject arm 5 is rotated to release the end 5c from the adapter 13 so that the adapter 13 is inserted inside the shelf 3 to a position where the springs 11 abuts on the curves 13f of the adapter 13 as shown in FIG. 5.

In order to exchange the CD 12 in the magazine 1, the magazine 1 is taken out of the CD player 2. The end 5b of the eject arm 5 in the shelf 3 holding the 8 cm CD 12 to be replaced is pushed by a finger of the user to rotate it about the pin 5a so that the adapter 13 is pushed out of the magazine until the lobes 11a of the springs 11 engage the second recesses 13e as shown in FIG. 8. Thus, a part of the CD 12 is exposed so that the CD 12 can be picked out against the lugs 13b. A new 8 cm CD is inserted in the shelf 3. Hence the CD 12 can be easily exchanged.

Figure 9:
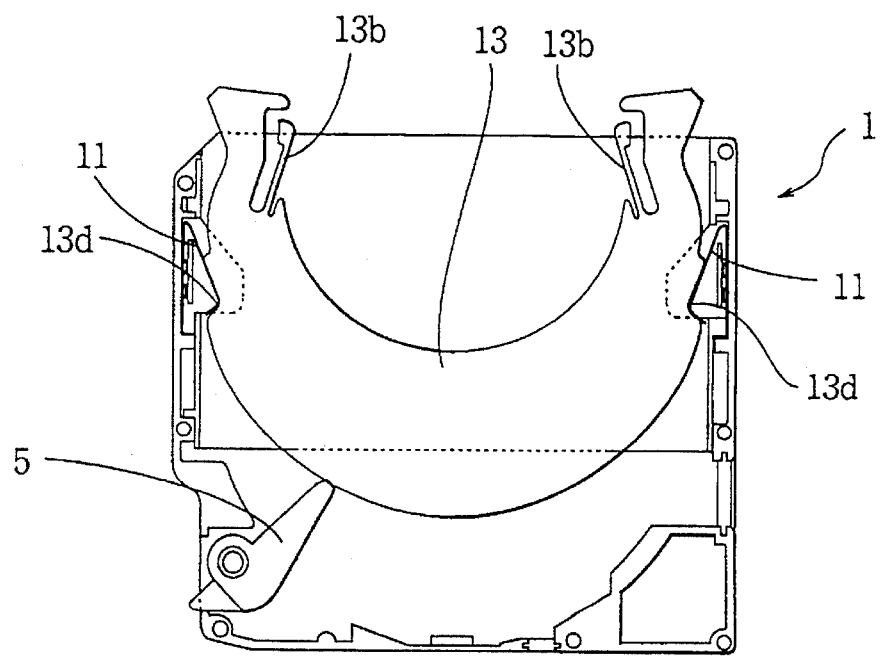
FIG. 9 is a diagram explaining the position of the CD adapter in the magazine at the removal of the adapter.
Figure 10:
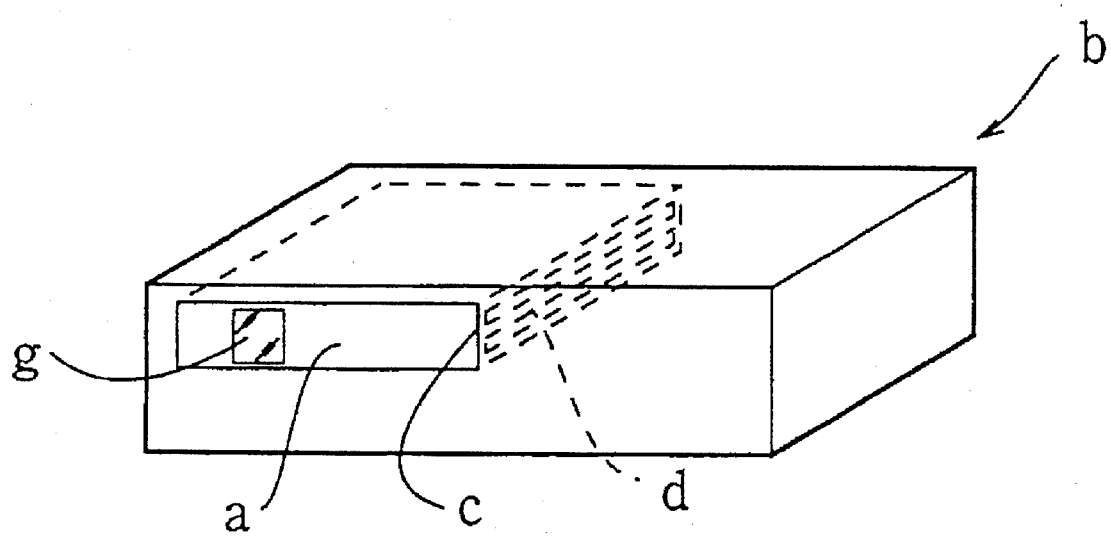
FIG. 10 is a schematic perspective view of a conventional CD player and magazine.

When taking out the adapter 13 from the magazine 1, the eject arm 5 is further rotated so that the adapter 13 is pushed forward until the lobes 11a engages with the first recesses 13d as shown in FIG. 9. In this position, the front ends of the adapter 13 project out of the shelf 3, thereby enabling the ends to be pulled out by hand. Thus the adapter 13 can be removed.

When the CD adapter of the present invention is used, the 8 cm CD is disposed off the center in each shelf of the magazine toward the CD opening. By slightly pushing the CD adapter, the CD projects out through the opening so as to be taken out by hand with ease. Hence the 8 cm CDs can be easily exchanged without taking out the entire adapter.

Moreover, only the CD is loaded in the playback section in the CD player so that the CD is reproduced without fail.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An adapter for playing a CD having a reduced diameter by a CD player having a magazine which has a plurality of shelves each of which is provided for mounting a CD of a standard diameter, said adapter comprising:

an adapter body having a thickness sized to be inserted in the magazine through an opening therein, and to be disposed on a shelf of the magazine, said adapter body having a semi-circular shape and having an inner arc corresponding to a circumference of the reduced diameter CD wherein the reduced diameter CD is inserted in the arc in a radial direction; and wherein the adapter is arranged such that a center of the inner arc of said adapter is offset from a center of the CD of the standard diameter mounted on the shelf when the adapter is mounted on the shelf of the magazine.

2. An adapter for playing a CD according to claim 1, wherein said adapter has an outer arc which essentially corresponds to a portion of an outer arc of a standard diameter CD.

\* \* \* \* \*